United States Patent [19]

Yang

[11] Patent Number: 5,130,368
[45] Date of Patent: Jul. 14, 1992

[54] COLLOIDAL POLYMERIC COMPOSITIONS FOR FIBROUS SUBSTRATE SATURATION

[75] Inventor: Philip Y. Yang, Bay Village, Ohio

[73] Assignee: The B. F. Goodrich Company, Akron, Ohio

[21] Appl. No.: 422,323

[22] Filed: Oct. 16, 1989

[51] Int. Cl.$^5$ ............................................. C08L 33/00
[52] U.S. Cl. ...................................... 524/821; 524/822
[58] Field of Search ................ 526/370; 524/821, 822

[56] References Cited

U.S. PATENT DOCUMENTS 4,831,078  5/1989  Kuhara et al. ..................... 524/822

Primary Examiner—Joseph L. Schofer
Assistant Examiner—Jeffrey T. Smith
Attorney, Agent, or Firm—George W. Moxon, II; Laura F. Shunk

[57] ABSTRACT

A colloidal system is provided which is the emulsion polymerization product of an alkyl ester of acrylic or methacrylic acid where the alkyl portion of the ester substituent has from about 1 to about 18 carbon atoms; from about 0.5 to about 60 phm of acrylonitrile or substituted acrylonitrile; from about 0.005 to about 25 phm of a monocarboxylic or dicarboxylic acid; and optionally from about 0 to about 5 phm of a chain transfer agent. The latex system can be used to treat a fibrous substrate, and particular paper, to improve delamination and tensile characteristics.

12 Claims, No Drawings

COLLOIDAL POLYMERIC COMPOSITIONS FOR FIBROUS SUBSTRATE SATURATION

FIELD OF THE INVENTION

The present invention relates generally to colloidal compositions for use for fibrous substrates, and more particularly to latex compositions comprising an alkyl ester of acrylic or methacrylic acid, acrylonitrile or a substituted acrylonitrile, a monocarboxylic or dicarboxylic acid and optionally a chain transfer agent.

BACKGROUND OF THE INVENTION

It is well known that latex can be applied to fibrous substrates, such as paper to increase the strength of the treated substrate. For tape and abrasive paper applications, delamination resistance (internal bond strength) and stretch are as important as tensile strength. Wet tensile strength is also essential for many applications. Conventionally, increasing the flexibility of the latex system, such as adding plasticizers, is used to modify properties. However, this often reduces the tensile strength and sacrifices delamination resistance. A more rigid, stronger latex polymer system may be produced by the addition of thermoset resins. However, this results in a sacrifice of the stretch of the resulting saturated paper. A conventional means to increase the wet strength is to use a crosslinking agent, such as N-methyloacrylamide. However, this results in the subsequent release of formaldehyde.

SUMMARY OF THE INVENTION

The invention provides a colloidal system for use for fibrous substrates comprising the polymerization product made from 1) about 0.5 to about 60 phm of one or more of an acrylonitrile or substituted acryonitrile such as methacrylonitrile or alpha-ch-loroacrylonitrile and alpha-bromoacrylonitrile;

2) about 0.05 to about 25 phm of one or more acidic ethylenically unsaturated monomers;

3) 0 to about 5 phm of one or more chain transfer agent, and 4) at least one copolymerizable monomer having at least one terminal

and preferably an alkyl ester of acrylic or methacrylic acid where the alkyl portion of the ester substituent has from about 1 to about 18 carbon atoms, the amount thereof being the remainder of the monomers to equal 100 phm by weight.

The invention further relates to a fibrous substrate which is treated with this colloidal system.

The colloidal system in accordance with the invention presents the advantage that it can be used to treat a fibrous substrate to improve tensile strength, delamination resistance and stretch characteristics.

It is a further advantage of the present invention to present a colloidal system and preferably a latex which substantially increases the wet strength of the substrate without releasing formaldehyde.

It is a further advantage of the present invention to provide a treated fibrous substrate, such as saturated paper which has improved physical properties. Such products may be used for applications such as masking tape, label stock and abrasive paper.

DETAILED DESCRIPTION OF THE INVENTION

The present invention relates to a colloidal system which can be used to treat fibrous substrates. The colloidal system comprises the emulsion polymerization product of 1) from about 0.5 to about 60 phm of one or more of acrylonitrile or substituted acrylonitrile such as methacrylonitrile or alpha-chloroacrylonitrile and alpha-bromoacrylonitrile;

2) from about 0.05 to about 15 phm of one or more acid ethylenically unsaturated monomer, and preferably one or more monocarboxylic or dicarboxylic acid; and 3) from about 0 to about 5 phm of one or more chain transfer agent, 4) at least one copolymerizable monomer having at least one terminal

and preferably at least one monomer of an alkyl ester of acrylic or methacrylic acid where the alkyl portion of the ester substituent has from 1 to 18 carbon atoms, the amount thereof being the remainder of the monomers to equal 100 phm by weight.

The copolymerizable monomer having at least one terminal

is preferably an alkyl ester of acrylic or methacrylic acid and may comprise one monomer or combinations of monomers. The alkyl portion of the ester substituent has from about 1 to about 18 carbon atoms; preferably from about 1 to about 12 carbon atoms; and most preferably from about 1 to about 8 carbon atoms. Other comonomers may be added in minor amounts and are intended to be covered within the ranges given. The term "minor amount" is used here to mean an amount which doesn't negatively impact on the desired properties. By way of example, such a comonomer might be a relatively low amount of an ethylenically unsaturated monomer, such as ethylene vinyl acetate or the like. Specific examples of the alkyl esters of acrylic or methacrylic acid which are suitable include butyl acrylate, ethylacrylate, and 2-ethyl hexylacrylate. Most preferably this monomer is butylacrylate. The amount of this component is the amount remaining from 100 parts of monomer (phm) by weight after subtracting from 100 the total of the other monomeric components.

Another component of the latex system is acrylonitrile and/or substituted acrylonitrile such as methacrylonitrile, alpha-chloroacrylonitrile, and alpha-bromoacrylonitrile. This component is present in an amount from about 0.5 to about 60 phm by weight, preferably from about 2 to about 25 phm by weight. Acrylonitrile or methacrylonitrile is preferred, and acrylonitrile is most preferred.

The third component of this system is one more acidic ethylenically unsaturated monomers, and preferably a monocarboxylic or dicarboxylic acid. This acid is present from about 0.05 to about 25 phm by weight, preferably from about 0.1 to about 10 phm by weight, and most preferably from about 1 to about 6 phm by weight. This acid is a monocarboxylic acid, such as acrylic acid or methacrylic acid; or a dicarboxylic acid, such as itaconic acid, maleic acid, fumaric acid, adipic acid, succinic acid and the like, or combinations thereof. It is preferably that the acid is acrylic acid, methacrylic acid, itaconic acid, and/or maleic acid.

The chain transfer agent is optional, but may be used to effect a better balance of properties. If used, it is present in an amount greater than 0 to about 5 phm, preferably from about 0.001 to about 3 phm, and most preferably from about 0.1 to about 1 phm. Examples of well known chain transfer agents which may be used include short and long-chain alkyl mercaptans, e.g., amyl mercaptan, n-dodecylmercaptan, t-dodecyl mercaptan, dialkyl xanthogen disulfides, e.g., diisopropyl xanthogen disulfide, mercaptocarboxylic acids such as mercaptopropionic acid, alkaryl mercaptans such as benzyl mercaptan, long-chain alcohols, such as lauryl alcohol and t-octyl alcohol, halogenated hydrocarbons, such as $CCl_4$ and $CBrCl_3$, and substituted mercaptans such as hydroxyethyl mercaptan.

Additionally, it will be necessary to use initiator and an emulsifier as is known in the art. Initiators are generally used at from about 0.05 to about phm by weight and preferably from about 0 to about 1 phm by weight. Such compounds generally include salts of peroxydisulfate, as well as the combination of oxidizing and reducing agents, i.e. "redox" systems. The latter category includes the following:

| Oxidizing Agents | Reducing Agent |
|---|---|
| $NH_4k_2S_2O_8$ or | $Na_2S_2O_4$ |
| $H_2O_2$ and | $Zn\ S_2O_4$ |
| $(CH_3)_3COOH$ | $NaHSO_2CH_2O2H_2O$ |
|  | $Na_2S_2O_5$ |

Initiators may be used alone or in combination may be added separately or together according to the time point during the polymerization process at which they are added. Emulsifiers are generally used in the present invention from about 0 to about 10 phm, and preferably from about 0.5 to about 7 phm. These compounds are known in the art and include saturated fatty acids, alkyl sulfates, alkyl sulfonates, alkyl benzene sulfonates, dinalkyl sulfosuccinates, ether alcohol sulfates, and polyoxyethylene nonyl phenyl ethers.

Additional additives may be added as are known in the art including but not limited to electrolytes, pH control agents, and pigments. The pH of the latex system may subsequently be altered to effect the solubility of the polymer in the water.

The colloidal systems of the present invention can be applied to various fibrous substrates. Preferably the substrate is composed of cellulosic fibers and/or mixtures of these with synthetic fibers. This can include paper, non-wovens, and textiles. Methods of application or treatment are known in the art and include saturation, spraying and coating.

These colloidal systems are made by conventional emulsion polymerization or solution polymerization. Specifically this implies that the polymerization is run in water, or in water and additional organic solvent, and that the resultant polymer product is a colloidal suspension in water. Typically, these latexes have a dry solids content of around 20 to 70 percent, and preferably from about 45 to about 60 percent.

By way of example, the emulsion polymerization reaction which was used to produce the samples of the Examples is set forth below.

A monomer premix was made and comprised the monomers, a major portion of the emulsifier and approximately half of the demineralized water at ambient temperature. The reactor was subsequently charged with the remaining minor amount of emulsifier, a major amount of initiator, pH control agent, and the remaining demineralized water. This aqueous mixture was brought to reaction temperature in a nitrogen blanket, about 70° C., and the monomer premix was metered in over a three hour period while the temperature was maintained between 70° and 75° C. At the end of this period aliquots of additional initiators were added at timed sequences. The reaction was allowed to run an additional 2.5 hours to complete the reaction. During the last hour, the temperature was maintained at 40° C. In general, the solid contents of the resulting latex was near 50 percent.

For further testing, this latex was mixed with a wetting agent. The total solids content was regulated so that the pickup of saturated paper would be 75±5 percent solids. The base paper used had a basis weight at 14 lbs./ream and a caliper of 5.5 mils. This base paper was saturated in the latex and passed through a rubber padder to remove excess latex. The saturated paper was dried at 99° C. for one minute, followed by aging at 140° C. for 30 minutes. Before testing, the samples were equilibrated and tested at 70° F. and 50 percent relative humidity in a controlled environment. The samples were tested for the following characteristics: delamination, total stretch, total energy absorption, dry tensile strength and wet tensile strength and wet strength retention. The delamination test is a standard test for the Technical Association at the Pulp and Paper Industry (TAPPI) UM 569 Method B, using Bondex blue denim tape made by Wright Home Sewing Company, West Warren, Mass. Samples for delamination were 1×6 inches.

Tensile characteristics were tested following the guidelines set forth in TAPPI T494 om-81. The samples were cut to 15 mm×52.4 mm along the machine direction for these tests. Tensile strength was measured at 12 inch per minute cross-head speed. To measure wet tensile strength, the samples were soaked for 20 minutes in a 1 percent solution of surfactant, octylphenoxypolyethoxyethanol. Total stretch is the elongation at break. Total energy absorption is the integration of the curve of stress versus strain and is a measurement of the energy to break. Wet strength retention is the ratio of wet tensile strength over dry tensile strength. The results of these tests are set forth in Table I.

EXAMPLE 1

A plain sample of base paper was tested for the properties listed to provide a control. This is Sample A.

EXAMPLE 2

The latex system of Example 2 was made in a stirred polymerization reactor as set forth generally above using the following ingredients:
1) N-butyl acrylate: 89 phm
(2) acrylonitrile: 9 phm
(3) itaconic acid: 2 phm
(4) chain transfer agent (tertiary dodecylmercaptan: 0.2 phm In all cases the emulsifier used was Dextrol OC-15 at 3 phm, the initiator used was ammonium persulfate at 0.2 phm as the initial aliquot, and sodium hydroxide was used as a pH control agent at 0.2 phm. This sample was applied to paper as previously stated and is labeled Sample B.

EXAMPLE 3

The latex system of Example 3 was made in a stirred polymerization reactor as set forth in Example 2 except the basic ingredients included:
(1) N-butyl acrylate: 88 phm
(2) acrylonitrile: 10 phm
(3) acrylic acid: 2 phm
(4) chain transfer agent (tDDM): 0.2 phm This sample was applied to paper as previously described and is labeled Sample C.

EXAMPLE 4

The latex system of Example 4 was made in a stirred polymerization reactor as set forth in Example 2 except that the basic ingredients included:
(1) N-butyl acrylate: 88 phm
(2) acrylic acid: 2 phm
(3) acrylonitrile: 10 phm This latex system was applied to base paper as previously described and is labeled Sample D.

EXAMPLE 5

The latex system of Example 5 was made in a reactor as set forth in Example 2 except that the basic ingredients included:
(1) N-butyl acrylate: 88 phm
(2) acrylic acid: 2 phm
(3) chain transfer agent (tDDM): 0.2 phm
(4) methyl methacrylate: 10 phm This latex system was applied to base paper as previously described and is labeled Sample E.

EXAMPLE 6

The latex system of Example 6 was made in a reactor as set forth in Example 2 except that the basic ingredients included:
(1) N-butyl acrylate: 89 phm
(2) acrylic acid: 2 phm
(3) methyl methacrylate: 9 phm
(4) chain transfer agent (tDDM): 0.2 phm The latex system was applied to base paper as previously described and is labeled Sample F.

EXAMPLE 7

The latex system of Example 7 was made in a reactor as set forth in Example 2 except that the basic ingredients included:
(1) N-butyl acrylate: 84.5 phm
(2) acrylic acid: 2 phm
(3) styrene: 13.5 phm
(4) chain transfer agent (tDDM): 0.2 phm The latex system was applied to base paper as previously described and is labeled Sample G.

EXAMPLE 8

The latex system of Example 8 was made in a reactor as set forth in Example 2 except that the basic ingredients included:
(1) N-butyl acrylate: 90 phm
(2) acrylonitrile: 10 phm
(3) chain transfer agent (tDDM): 0.2 phm The latex system was applied to base paper as previously described and is labeled Sample H.

EXAMPLE 9

The latex system of Example 9 was made in a reactor as set forth in Example 2 except that the basic ingredients included:
(1) N-butyl acrylate: 98 phm
(2) acrylic acid: 2 phm
(3) chain transfer agent (tDDM): 0.2 phm The latex system was applied to base paper as previously described and is labeled Sample I.

The results of the tests described are set forth in Table I.

TABLE I

| SAMPLE | N-Butyl acrylate (phm) | Acrylonitrile (phm) | Acrylic Acid (phm) | Itaconic Acid (phm) | Chain Transfer Agent (phm) | Others (phm) |
|---|---|---|---|---|---|---|
| A[1] | | | | | | |
| B | 89.0 | 9.0 | — | 2.0 | 0.2 | — |
| C | 88.0 | 10.0 | 2.0 | — | 0.2 | — |
| D | 88.0 | 10.0 | 2.0 | — | — | — |
| E | 88.0 | — | 2.0 | — | 0.2 | 10.0[2] |
| F | 89.0 | — | 2.0 | — | 0.2 | 9.0[2] |
| G | 84.5 | — | 2.0 | — | 0.2 | 13.5[3] |
| H | 90.0 | 10.0 | — | — | 0.2 | — |
| I | 98.0 | — | 2.0 | — | 0.2 | |

| SAMPLE | Delamination (grams) | Total Stretch (%) | Dry Tensile Strength (kg/1.5 cm) | Total Energy Abosrption (kg/1.5 cm) | Wet Tensile Strength (kg/1.5 cm) | Wet Strength Retention Units (%) |
|---|---|---|---|---|---|---|
| A | 52.0 | 1.3 | 3.1 | 0.03 | 0.03 | 1 |
| B | 913.0 | 26.8 | 4.7 | 0.6 | 2.6 | 55 |
| C | 928.0 | 24.8 | 5.1 | 0.7 | 2.9 | 57 |
| D | 713.0 | 5.3 | 6.5 | 0.2 | 3.4 | 52 |
| E | 374.0 | 8.7 | 2.6 | 0.1 | 0.6 | 23 |
| F | 284.0 | 9.5 | 2.3 | 0.1 | 0.4 | 17 |
| G | 393.0 | 12.0 | 3.3 | 0.2 | 0.7 | 21 |
| H | 555.0 | 27.4 | 3.6 | 0.5 | 0.2 | 6 |

TABLE I-continued

| 1 | 99.0 | 4.1 | 1.7 | 0.1 | 0.1 | 6 |

(1) No latex
(2) methyl methacrylate
(3) styrene

Wet strength retention, dry tensile strength, and delamination resistance are substantially increased in Sample D which represents the latex system having acrylonitrile and carboxylic acid. Further, in Samples B and C, which also include the chain transfer agent, increases in these properties were augmented by improvements in total stretch and total energy absorption. In contrast, test values for these characteristics are lower in Samples E, F and G in which the acrylonitrile is replaced with methyl methacrylate or styrene. Similarly, test values for these characteristics are lower for Samples H and I which respectively have acrylonitrile or the acid component. Thus, the test results demonstrate a surprising synergy when acrylonitrile and carboxylic acid are copolymerized with the alkyl ester of acrylic or methacrylic acid of the present invention. Even more surprising is the improvement in balance of properties achieved when a chain transfer agent is added.

While in accordance with the Patent Statutes, the best mode and preferred embodiment has been set forth, the scope of the invention is not limited thereto, but rather by the scope of the attached claims.

What is claimed is:

1. A colloidal system for fibrous substrate saturation comprising the polymerization product made from at least three components comprising;
  (1) from about 2 to about 25 phm of a first component comprising one or more monoethylenically unsaturated nitrile monomers having the formula:

$H_2C=CR-CN$ wherein R is selected from the group consisting of hydrogen, $C_1-C_4$ alkyl, chlorine, and bromine,
  (2) from about 0.1 to about 10 phm of a second component comprising one or more acidic ethylenically unsaturated monomers;
  (3) a third component comprising at least one copolymerizable monomer having at least one terminal $CH=C$ group and which is an alkyl ester of acrylic or methacrylic acid where the alkyl portion of the ester substituent has from about 1 to about 18 carbon atoms, the amount of the first, the second, and the third components equaling 100 phm by weight.

2. A colloidal system as set forth in claim 1, wherein said system is a latex and is made by emulsion polymerization.

3. A collodial system as set forth in claim 2, wherein said one or more acidic ethylenically unsaturated monomers is one or more monocarboxylic or dicarboxylic acid.

4. The colloidal system as set forth in claim 1, wherein said alkyl portion of said alkyl ester of acrylic or methacrylic acid has from about 1 to about 12 carbon atoms.

5. The colloidal system as set forth in claim 4, wherein said alkyl ester of acrylic or methacrylic acid is one or more monomers selected from the group consisting of butyl acrylate, ethyl acrylate, and 2-ethyl hexyl acrylate.

6. The colloidal system as set forth in claim 1, wherein said polymerization product is made from about 2 to about 25 phm of said one or more of acrylonitrile, methacrylonitrile, and from about 1 to about 6 phm of said second component.

7. The colloidal system as set forth in claim 6, wherein said polymerization product is made including more than about 0 to about 3 phm of a chain transfer agent.

8. The colloidal system as set forth in claim 7, wherein said polymerization product is made including from about 0.1 to about 1 phm of a chain transfer agent.

9. The colloidal system as set forth in claim 8, wherein said first component comprises acrylonitrile.

10. The colloidal system as set forth in claim 9, wherein said monocarboxylic or dicarboxylic acid is one or more members selected from the group consisting of acrylic acid, methacrylic acid, itaconic acid and maleic acid.

11. The colloidal system as set forth in claim 10, wherein said chain transfer agent is tertiary dodecyl mercaptan.

12. The colloidal system of claim 1, further including up to 5 phm by weight of a chain transfer agent.

* * * * *